(12) United States Patent
Lange et al.

(10) Patent No.: US 7,689,669 B2
(45) Date of Patent: *Mar. 30, 2010

(54) SYSTEM AND METHOD FOR ACCESSING A PROCESS CONTROL AUTOMATION DEVICE FROM A NETWORK CLIENT

(75) Inventors: Ronald Lange, Fürth (DE); Frank Springer, Hohenstadt (DE)

(73) Assignee: Siemens Aktiengesellschaft, Munich (DE)

( * ) Notice: Subject to any disclaimer, the term of this patent is extended or adjusted under 35 U.S.C. 154(b) by 1224 days.

This patent is subject to a terminal disclaimer.

(21) Appl. No.: 10/492,273

(22) PCT Filed: Sep. 25, 2002

(86) PCT No.: PCT/DE02/03617

§ 371 (c)(1),
(2), (4) Date: Apr. 8, 2004

(87) PCT Pub. No.: WO03/034161

PCT Pub. Date: Apr. 24, 2003

(65) Prior Publication Data

US 2004/0246944 A1      Dec. 9, 2004

(30) Foreign Application Priority Data

Oct. 8, 2001   (DE) ................ 101 49 480

(51) Int. Cl.
*G06F 15/16* (2006.01)
(52) U.S. Cl. .................. 709/219; 709/217; 709/218; 709/227; 709/228; 709/229; 709/245; 709/250

(58) Field of Classification Search ......... 709/217–219, 709/227–229, 245, 250
See application file for complete search history.

(56) References Cited

U.S. PATENT DOCUMENTS

| | | | |
|---|---|---|---|
| 6,438,594 B1* | 8/2002 | Bowman-Amuah | 709/225 |
| 6,560,607 B1* | 5/2003 | Lassesen | 707/101 |
| 7,003,558 B2* | 2/2006 | Agrusa et al. | 709/223 |
| 7,136,857 B2* | 11/2006 | Chen et al. | 707/10 |
| 7,181,731 B2* | 2/2007 | Pace et al. | 717/136 |
| 2001/0047383 A1* | 11/2001 | Dutta | 709/201 |
| 2002/0138848 A1* | 9/2002 | Alao et al. | 725/109 |
| 2002/0156838 A1* | 10/2002 | Batke et al. | 709/203 |
| 2002/0174178 A1* | 11/2002 | Stawikowski | 709/203 |
| 2007/0198724 A1* | 8/2007 | Hawkinson et al. | 709/226 |

FOREIGN PATENT DOCUMENTS

| | | |
|---|---|---|
| DE | 199 09 157 A1 | 9/2000 |
| DE | 199 62 787 A1 | 10/2000 |
| DE | 101 12 843 A1 | 9/2001 |
| WO | WO 01/22681 A2 | 3/2001 |
| WO | WO 01/57651 A2 | 8/2001 |

\* cited by examiner

*Primary Examiner*—Nathan Flynn
*Assistant Examiner*—Mohamed Wasel

(57) ABSTRACT

A method for accessing an appliance, especially an automation appliance with a standardized interface, by means of a first processing device via a data network. A call is sent from the first data processing device to the second data processing device via the data network, and an address for identifying the appliance is extracted in the second data processing device from the call of the first data processing device to the second data processing device and used to identify the appliance. Information pertaining to the appliance can be accessed via the standardized interface of the appliance by means of the address extracted in the second data processing device.

15 Claims, 2 Drawing Sheets

SYSTEM AND METHOD FOR ACCESSING A PROCESS CONTROL AUTOMATION DEVICE FROM A NETWORK CLIENT

CROSS REFERENCE TO RELATED APPLICATIONS

This application is the US National Stage of International Application No. PCT/DE02/03617, filed Sep. 25, 2002 and claims the benefit thereof. The International Application claims the benefits of German application No. 10149480.7 filed Oct. 8, 2001, both applications are incorporated by reference herein in their entirety.

FIELD OF INVENTION

The invention relates to a system and method for accessing a device, in particular an automation device with a standardized interface.

BACKGROUND OF INVENTION

A system and method of this kind are used for example in the field of automation technology, for production equipment and machine tools, etc. In automation technology, standard interfaces for accessing the devices have become established. Examples of such interfaces are OPC and PROFInet. The characteristics of these interfaces are always tied to a specific communication technology, this being COM/DCOM in the two cases mentioned. There is however a requirement to be able to address these interfaces also by means of new communication technologies, such as, for example, access via the Web.

SUMMARY OF INVENTION

The object of the invention is to specify a system and a method for accessing a device, said system and method requiring no modification of the device itself and also no additional configuration of a data processing device connected to the device.

The invention is based on the knowledge that with previous solutions it was necessary to supplement the devices with the addition of a new communication protocol, for example the use of wrappers (i.e. communication converter) on the client or device side, or the use of additional servers (devices), i.e. the wrapper is exported to a separate device. In this case, however, a configuration of this server is typically necessary (e.g. which lower-layer devices are there?). If there is a system expansion/change, the configuration of the server must therefore also be modified to match. The reasons for the need for configuration here are: No standardized access interface to the devices. As a result the access interface (communication protocol, method signature, . . . ) must be reconfigured at the server for each device or it may even be necessary to load corresponding driver software. In order to access the devices the server must know each device's network address. This must therefore be configured or updated accordingly if there is a charge.

With the method according to the invention, on the other hand, the device is accessed via a standardized interface of the totally unmodified device. This is made possible by the sending of a call from the first data processing device over a data network, e.g. the Internet, to the second data processing device, with supplementary data in the form of an address of the device concerned being contained in the call. In the second data processing device this supplementary data is extracted from the data of the call and the access is effected via the address thus extracted over the device's standardized interface.

The necessary supplementary information is passed on here, not as part of the configuration management of the server, but as a component of the server address. URLs (Uniform Resource Locator) are used for addressing. Thus, the server can generate for example an HTML page of a PROFInet device whose address it only receives at the time of the retrieval query. A "page" is therefore retrieved via, for example, http://hostx:5001/MiniCBA/hosty, where "hostx" is the DNS name of the second data processing device in the form of a proxy server and "hosty" is the DNS name of the device.

The special aspect of the invention lies in the use of a server which does not need to be configured, since the necessary supplementary information is contained in the addressing. This method exploits the fact that the addressing and the access interface of OPC servers or PROFInet devices are uniform. Accordingly, a new communication protocol (in other words, for example, access via browser by way of HTTP and HTML page) can be added without the devices having to be expanded for that purpose or the aforementioned server having to be configured.

The result, in particular in the field of automation technology, i.e. primarily production and process automation, is the possibility of online service and support as well as an HMI interface for control and monitoring purposes, including remotely, i.e. from a remote data processing device which itself has no direct means of communication with the device.

An advantageous application for the invention is that the device is an automation device, in particular a Profinet device.

Because of the standard interfaces of OPC servers and, for example, Profinet devices, the invention can be particularly advantageously used in those cases in which the standardized interface of the device is a COM and/or DCOM interface.

A data output at the location where the retrieval query was issued is made possible in that after information of the device has been accessed, the information is transmitted from the device to the second data processing device and from there, via the data network, to the first data processing device.

A particularly advantageous application owing to the spread of data networks is that the Internet and/or an intranet is provided as the data network, and HTTP as the communication protocol. Advantageously, response data HTML and/or XML is provided here for transmitting the information to be retrieved from the device.

A more selective control of the device can be achieved if the call for the device and/or the second data processing device includes certain additional parameters for controlling the content and/or format of the output of the information to be retrieved from the device. Thus, the content of the output and the output format can be controlled by means of further parameters. Accordingly, it can be specified, for example, via http://hostx:5001/MiniCBA?Address=hosty&Hierarchy=3&IsXML=1 that the user first wants to see the third hierarchy level of the PROFInet objects and that the output format is to be XML.

BRIEF DESCRIPTION OF THE DRAWINGS

The invention will be described and explained in more detail below with reference to the exemplary embodiments represented in the figures, in which.

DETAILED DESCRIPTION OF INVENTION

Figure 1:
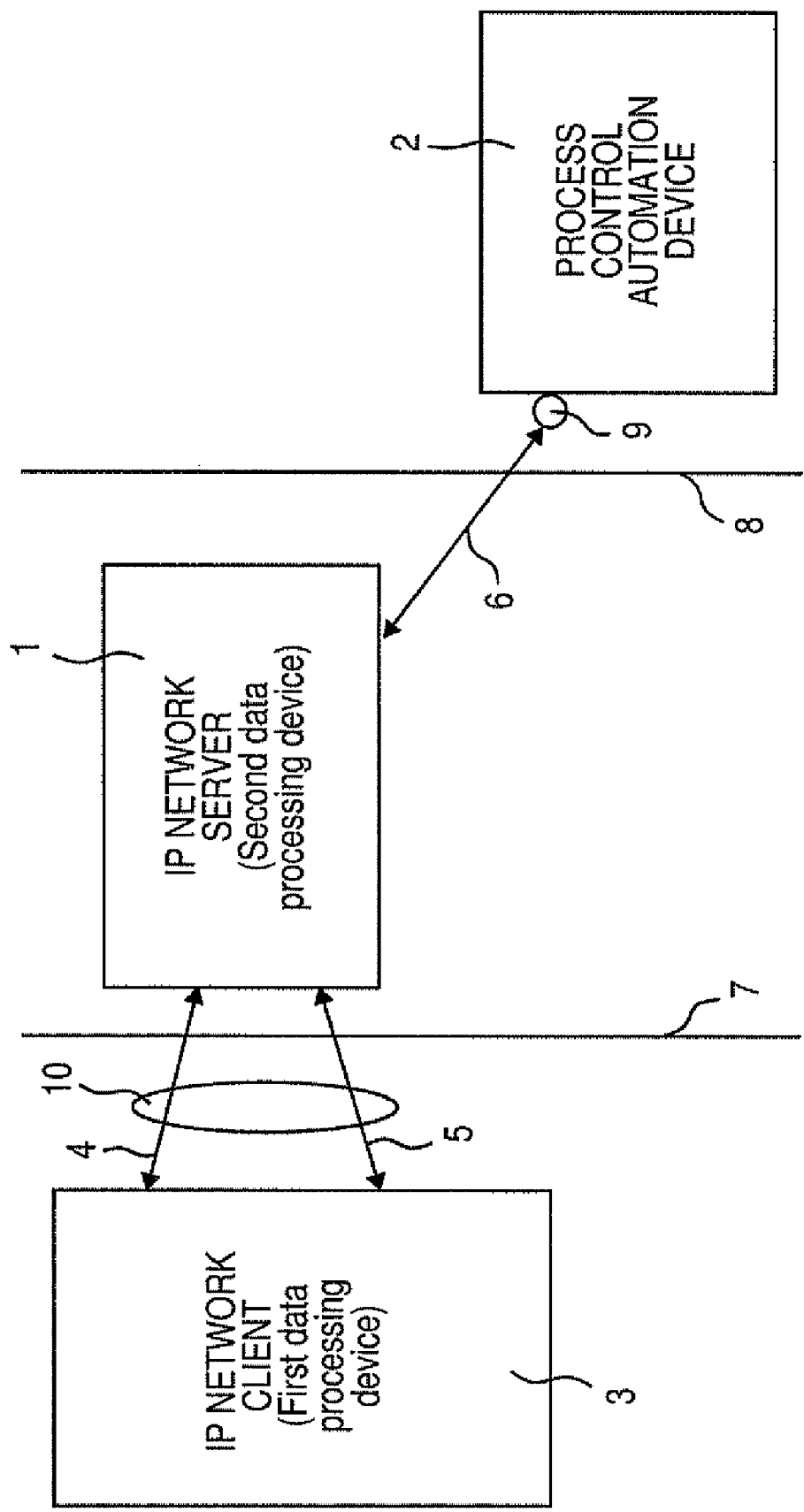
FIG. 1 shows a block diagram of an exemplary embodiment of a system for accessing an automation device over its standardized interface.

FIG. 1 shows a block diagram of an exemplary embodiment of a system for accessing an automation device 2 via its standardized interface 9 from a first data processing device 3. The system depicted in FIG. 1 essentially consists of a first data processing device 3, a second data processing device 1 and a device 2, in particular an automation device for a data network 10, for example the Internet. A call 4 is issued by the first data processing device 3 to the second data processing device 1. A possible computer boundary between the first data processing device 3 and the second data processing device 1 is indicated by a separating line 7. In the call 4, which is sent to the second data processing device 1, there is contained an address which identifies the device 2. The second data processing device 1, for example a web server, extracts the address of the device 2 from the data of the call 4. A data access to the address of the device 2 extracted in this way is then executed by the second data processing device 1 via a data link 6. The data is accessed here via a standardized interface 9 of the device 2. The reference symbol 8 in turn identifies a possible computer boundary between the second data processing device 1 and the device 2.

The special aspect of the system depicted in FIG. 1 consists in particular in that it is made possible with the aid of the address extraction in the second data processing device 1 to access information data of the device 2 from the first data processing device 3 even though a direct access from the first data processing device 3 is not possible. This indirect data access is made possible because the address of the device 2 is contained in the call 4 and is extracted by the second data processing device 1. The return transmission of the information data retrieved via the standardized interface 9 over the data channel 6 is effected via a return channel 5, which in turn uses, for example, an Internet data network 10.

Figure 2:
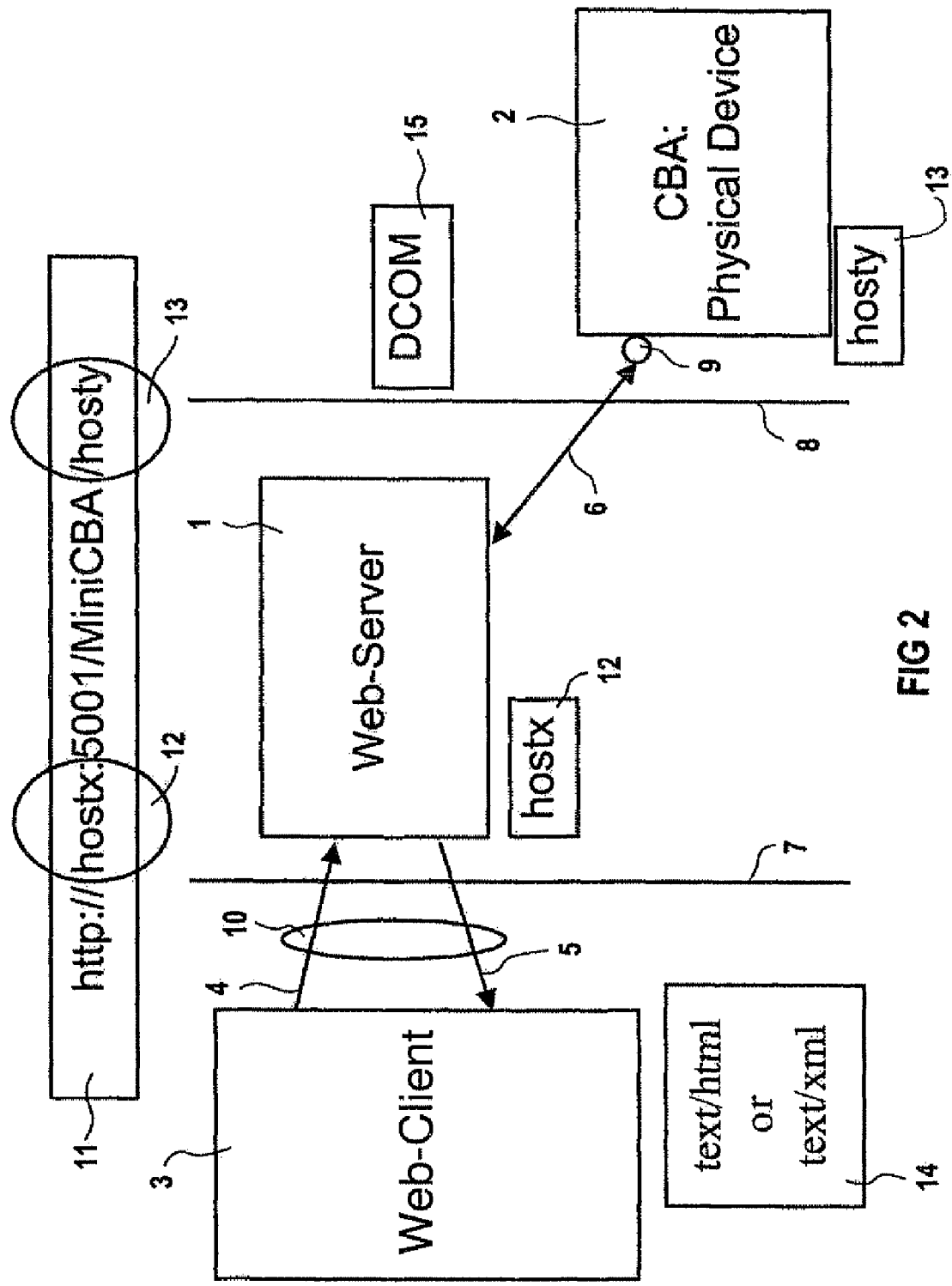
FIG. 2 shows a schematic representation of exemplary call data containing address data to be extracted.

FIG. 2 shows a schematic representation of exemplary call data 11 containing address data 13 to be extracted for addressing a device 2 via its standardized interface. FIG. 2 essentially contains the components already described in connection with FIG. 1. In addition, FIG. 2 again depicts by way of example a call 11, which is formed from an Internet address http://hostx:5001/MiniCBA/hosty, where a first component 12 of this address, i.e. hostx, denotes the address of the second data processing device 1, which acts as a so-called web server. A further component 13 of the address 11, i.e. hosty, denotes the address of the device 2. This further component 13 is extracted in the second data processing device 1 in order to enable a data access via the standardized interface 9 of the device 2. The data of the device 2 retrieved in this way is sent back via the data link 6 to the second data processing device 1 and from there transmitted in response data 5 to the first data processing device 3, for example in the form of text or as an html file (cf. reference symbol 14). As well as integrating the address data into the call 4 or the address 11 it is also possible to include further parameters which control the content of the output and/or the format. Thus, for example, it can be specified that the user would first like to see a specific hierarchy level of the device 2 and that a specific output format is desired.

In the example shown in FIG. 2, a client accesses the server with the (DNS) address 12, i.e. hostx, via the address 11 http://hostx:5001/MiniCBA/hosty. There, the address 13 of a PROFInet device (hosty) is extracted from the URL and said device is accessed via the interfaces specified by PROFInet by means of COM/DCOM (cf. reference symbol 15).

The lines 7, 8 in FIG. 2 shows possible computer boundaries of the data processing devices 3, 1, and also of the device 2. The line on the right again indicates that the new communication protocol (in this case HTTP) and the generation of the response (in this case HTML or XML) does not have to be integrated into the devices.

The structure of the URL is intended to serve only as an example here. The address http://hostx:5001/MiniCBA?Address=hosty or similar could equally well be used.

To sum up, the invention therefore relates to a system and a method for accessing a device, in particular an automation device with a standardized interface. It is proposed to realize a means of accessing data of the device from a data processing device via a data network, whereby a call 4 is sent from a first data processing device 3 via a data network to a second data processing device 1, and whereby an address 13 for identifying the device 2 is extracted in the second data processing device, said address being contained in the data of the call 4 of the first data processing device 3 to the second data processing device 1, with information relating to the device 2 being accessed via the standardized interface 9 of the device 2 by means of the address extracted in the second data processing device 1.

The invention claimed is:

1. A method for accessing a process control automation device from a network client, comprising:
    sending a call over a data network from a first data processing device to a second processing device using an Internet Protocol Universal Resource Locator (URL) comprising first and second address components, the first address component representing an IP address of the second data processing device, the second address component comprising address data identifying the process control device;
    in the second data processing device, extracting the address data; and
    the second data processing device accessing information of the process control automation device via the field bus interface using the address data extracted from the URL in the second data processing device, then formatting the information as a HyperText Markup Language (HTML) or Extensible Markup Language (XML) document, and transmitting this document to the network client over the data network;
    wherein the URL further contains parameters which are provided for controlling the content and/or the format of the output of the information to be retrieved from the process control automation device.

2. The method according to claim 1, wherein the field bus interface of the process control automation device is a COM and/or DCOM interface.

3. The method according to claim 1, wherein after information of the process control automation device has been accessed the information is transmitted by the process control automation device to the second data processing device and from there is transmitted to the first data processing device via the data network.

4. The method according to claim 1, wherein the Internet and/or an intranet is provided as the data network.

5. The method according to claim 1, wherein HTML and/or XML is used for transmission of the information to be retrieved from the process control automation device.

6. The method according to claim 1, wherein the process control automation device is a Profinet device.

7. A system that accesses a process control automation device from a network client, comprising:
- a first data processing device that sends a call using an Internet Protocol Universal Resource Locator (URL) comprising an IP address of a second data processing device via a data network to the second data processing device, which is linked to the process control automation device by a field bus interface;
- an extraction mechanism contained in the second data processing device that extracts an address for identifying the process control automation device, said address being contained in the URL from the first data processing device to the second data processing device; and
- an access mechanism that accesses information of the process control automation device via the field bus interface by the address extracted in the second data processing device;
- wherein the first data processing device accesses the information of the process control device automatically via the second data processing device without a modification of the first data processing device to implement a custom communication protocol for the access; and
- wherein the URL contains parameters which are provided for controlling the content and/or the format of the output of the information to be retrieved from the process control automation device.

8. The system according to claim 7, wherein the process control automation device is a Profinet device.

9. The system according to one of the claim 7, wherein the field bus interface is a COM and/or DCOM interface.

10. The system according to claim 7, wherein after information of the process control automation device has been accessed the information is transmitted by the device to the second data processing device and from there is transmitted to the first data processing device via the data network.

11. The system according to claim 7, wherein the Internet and/or an intranet is provided as the data network.

12. The system according to claim 7, wherein response data HTML and/or XML is provided for transmission of the information to be retrieved from the process control automation device.

13. The system according to claim 7, wherein HTTP is provided as a communication protocol on the data network.

14. A method for an Internet Protocol (IP) client to obtain information from a given process control automation device that is linked to an IP server via a field bus interface, comprising:
- the IP client transmitting over an IP network a first message addressed with a Universal Resource Locator (URL), wherein the URL includes an IP address of the IP server or a DNS name thereof, and further includes an identifier of the given automation device;
- the IP server receiving the first message, and identifying the given automation device via the identifier of the given automation device in the URL; and
- the IP server accessing information on the given automation device via the field bus interface, then formatting the information as a HyperText Markup Language (HTML) or Extensible Markup Language (XML) document, and transmitting this document to the IP client over the IP network;
- wherein the URL further contains parameters which are provided for controlling the content and/or the format of the output of the information to be retrieved from the process control automation device; and
- wherein the IP client further inserts an additional field in the URL that specifies a type of information of the given automation device to be returned to the IP client by the IP server.

15. The method of claim 14 wherein the identifier of the given automation device in the URL is a DNS name of the given automation device.

* * * * *